United States Patent
Gochi Garcia

(10) Patent No.: US 11,985,070 B2
(45) Date of Patent: May 14, 2024

(54) METHOD AND MODULE FOR MANAGING CLASSIFICATION CONFIGURATION FOR TRAFFIC IN SOFTWARE DEFINED NETWORK

(71) Applicant: Telefonaktiebolaget LM Ericsson (publ), Stockholm (SE)

(72) Inventor: Ibon Gochi Garcia, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1062 days.

(21) Appl. No.: 16/605,153

(22) PCT Filed: May 3, 2017

(86) PCT No.: PCT/EP2017/060505
§ 371 (c)(1),
(2) Date: Oct. 14, 2019

(87) PCT Pub. No.: WO2018/202288
PCT Pub. Date: Nov. 8, 2018

(65) Prior Publication Data
US 2023/0050350 A1   Feb. 16, 2023

(51) Int. Cl.
*H04L 47/2441* (2022.01)
*H04L 41/342* (2022.01)
(Continued)

(52) U.S. Cl.
CPC ........ *H04L 47/2441* (2013.01); *H04L 41/342* (2022.05); *H04L 41/5054* (2013.01); *H04L 47/20* (2013.01)

(58) Field of Classification Search
CPC ............... H04L 47/2441; H04L 41/342; H04L 41/5054; H04L 47/20; H04L 41/0894; H04L 41/0895; H04L 41/0886
(Continued)

(56) References Cited

U.S. PATENT DOCUMENTS

2012/0246325 A1* 9/2012 Pancorbo Marcos ... H04L 43/00
  709/227
2015/0117320 A1* 4/2015 Wang ................... H04W 4/023
  370/329
(Continued)

FOREIGN PATENT DOCUMENTS

CA  2751999 A1 * 3/2012  ......... H04L 12/1407
CN  102137373 A  * 7/2011  ......... H04L 12/1407
(Continued)

OTHER PUBLICATIONS

A Nam Hyunwoo et al: "Intelligent content delivery over wireless via SDN", 2015 IEEE Wireless Communications and Networking Conference (WCNC), IEEE, pp. 2185-21909, Mar. 2015 (Mar. 9, 2015) (Year: 2015).*
(Continued)

*Primary Examiner* — Tejis Daya
*Assistant Examiner* — Oladiran Gideon Olaleye
(74) *Attorney, Agent, or Firm* — Weisberg I.P. Law, P.A.

(57) ABSTRACT

A method and a classification configuration module for managing a classification configuration for traffic, related to a service, in a software defined network are disclosed. The classification configuration module receives the classification configuration from a service related module. The classification configuration includes a first indication indicating a traffic treatment for the traffic, and a second indication identifying the traffic to be treated according to the first indication for traffic treatment. The classification configuration module determines, based on the classification configuration, a set of traffic filters for use by a software defined network controlling module to determine a list of service functions implementing the traffic treatment for the traffic. The classification configuration module transmits informa-
(Continued)

tion relating to the set of traffic filters to the software defined network controlling module.

17 Claims, 11 Drawing Sheets

(51) Int. Cl.
  *H04L 41/5054* (2022.01)
  *H04L 47/20* (2022.01)
(58) Field of Classification Search
  USPC .......................................................... 370/235
  See application file for complete search history.

(56) References Cited

U.S. PATENT DOCUMENTS

| | | | |
|---|---|---|---|
| 2015/0207677 A1* | 7/2015 | Choudhury | H04L 41/0806 370/254 |
| 2015/0381515 A1* | 12/2015 | Mattson | H04L 47/70 707/722 |
| 2016/0234121 A1* | 8/2016 | Zou | H04L 45/64 |
| 2016/0262044 A1* | 9/2016 | Calin | H04L 47/2483 |
| 2016/0330111 A1* | 11/2016 | Manghirmalani | H04L 69/22 |
| 2018/0131578 A1* | 5/2018 | Cui | H04L 41/40 |

FOREIGN PATENT DOCUMENTS

| | | | | | |
|---|---|---|---|---|---|
| CN | 104869552 A | * | 8/2015 | ......... | H04L 12/1414 |
| CN | 105745940 A | * | 7/2016 | .......... | H04J 14/0201 |
| DE | 102014005323 A1 | * | 4/2015 | ............ | H04W 28/02 |
| WO | WO-2014130446 A1 | * | 8/2014 | ......... | H04L 12/1403 |
| WO | 2015135572 A1 | | 9/2015 | | |

OTHER PUBLICATIONS

3GPP TR 23.721 V14.0.0; 3rd Generation Partnership Project; Technical Specification Group Services and System Aspects; Study on Sponsored Data Connectivity Improvements (Release 14 ); Jun. 2016, consisting of 44-pages. (Year: 2016).*

European Search Report dated Jul. 30, 2020 for Application 17 721 634.8, consisting of 7-pages.

3GPP TS 29.251 v1.1.0 3rd Generation Partnership Project; Technical Specification Group Core Network and Terminals; Gw and Gwn reference points for sponsored data connectivity (Release 14); Apr. 2014, consisting of 25-pages.

International Search Report and Written Opinion dated Dec. 6, 2017 for International Application PCT/EP2017/060505 filed on May 3, 2017, consisting of 12-pages.

Hyunwoo, et al. "Intelligent Content Delivery over Wireless via SDN" 2015 IEEE Wireless Communications and Networking Conference (WCNC):-Track 4—Services, Applications , and Business, consisting of 6-pages.

Liu et al. "A Model of SDN Controllers Supporting for Processing of Flows Based on the IMS"; Korea University of Technology and Education, Cheonan, South Korea, 2015 IEICE, consisting of 4-pages.

3GPP TR 23.721 V14.0.0; 3rd Generation Partnership Project; Technical Specification Group Services and System Aspects; Study on Sponsored Data Connectivity Improvements (Release 14); Jun. 2016, consisting of 44-pages.

* cited by examiner

METHOD AND MODULE FOR MANAGING CLASSIFICATION CONFIGURATION FOR TRAFFIC IN SOFTWARE DEFINED NETWORK

CROSS-REFERENCE TO RELATED APPLICATIONS

This application is a Submission Under 35 U.S.C. § 371 for U.S. National Stage Patent Application of International Application Number: PCT/EP2017/060505, filed May 3, 2017 entitled "METHOD AND MODULE FOR MANAGING CLASSIFICATION CONFIGURATION FOR TRAFFIC IN SOFTWARE DEFINED NETWORK," the entirety of which is incorporated herein by reference.

TECHNICAL FIELD

Embodiments herein relate to software defined networks. In particular, a method and a classification configuration module for managing a classification configuration for traffic, related to a service, in a software defined network are disclosed. A corresponding computer program and a computer program carrier are also disclosed.

BACKGROUND

Within software defined networks, a concept known as Dynamic Service Chaining (DSC) allows for traffic segmentation per subscriber and service, or application. An example of a use case for DSC includes optimization of traffic related to a service, such as Wikipedia, which is an online encyclopedia. In this manner, improved download times may be achieved for the traffic related to the service. As a result of the improved download times, subscribers are encouraged increase the engagement with the service, e.g. the aforementioned Wikipedia.

FIG. 1 illustrates DSC in a Software Defined Network (SDN). In relation to DSC, the following functions and/or entities are introduced. An Over-The-Top (OTT) Control 101 allows e.g. an operator to send OTT classification rules, e.g. in a particular OTT specific format, to an Application Function (AF) 102. The AF may be said to be a quality controller for certain traffic. The AF interacts with a Policy and Charging Rules Function (PCRF) 103, over an Rx interface, in order to provide corresponding PCRF classification rules to the PCRF. The PCRF, in its turn, interfaces with a Software Defined Networking Controller Platform (SDNc-P) 104 over an St interface, a Policy and Charging Enforcement Function (PCEF) 105 over a Gx interface and a Service Capability Exposure Function (SCEF)/Packet Flow Description Function (PFDF) 106 over a Nt interface. The SCEF and the PFDF, which may or may not be co-located, allow a third party provider, such as the OTT Control, to share OTT classification rules with the SDN, comprising the SDNc-P 104. The SCEF/PFDF converts OTT classification rules, provided by the OTT Control 101, to PCEF classification rules, which may be provided to the PCEF over a Gw interface, and the PCEF may convert them into traffic filters to be submitted to the SDNc-P. The SDNc-P sends OpenFlow match filters to Service Functions (SFs) 108 in order to apply the treatment according to the received traffic filters. The SFs apply the OpenFlow match filters to OpenFlow switches (OFS) 109. Furthermore, FIG. 1 illustrates an OTT Payload 107 that delivers content to a user equipment 111. The OTT Payload 107 and the OTT Control 101 may or may not be co-located.

Now that the functions and/or entities involved in DSC have been introduced, approaches on how to implement functionality for DSC will be described.

In one approach, classification rules are fed as traffic filters or 5-tuples to the SDNc-P via a REST interface. The classification rules are extracted from the traffic, related to the service, via Deep Packet Inspection (DPI) techniques implemented in the PCEF or a Traffic Detection Function (TDF). The SDNc-P, after performing some logic to the traffic filters or 5-tuples reported, will convey that classification rules in the form of OpenFlow match filters to the switches. Finally, the switches will steer traffic according to their configured static routing policy as defined by the OpenFlow match filters.

In another approach, SDN for Dynamic Service Chaining uses the St interface between the PCRF and the SDNc-P for conveying traffic filters. In case an OTT, e.g. the OTT Control and/or the OTT Payload, is involved, the traffic filters can reach the SDNc-P via the AF and PCRF route, wherein OTT and/or PCRF classification rules are converted into the traffic filters, and no DPI is required. In case there is no OTT involved, or maybe if there is but some of the elements are missing, e.g. AF route is not used and PFDF is used instead, the traffic filters extracted from the PCEF after traffic classification can be reported via Gx to the PCRF. In its turn, the PCRF will send the traffic filters to the SDNc-P thought the St interface. Specifically, in this last scenario, OTT classification rules will be converted at the PFDF to PCEF classification rules and sent to the PCEF via the Gw interface. Upon classification of traffic in the PCEF by those PCEF classification rules, a traffic filter will be reported to the PCRF via the Gx interface with the PCRF conveying that information to the SDNc-P via the St interface.

Finally, some other approaches use extensions to Gx to mark data flows in the PCEF via Network Service Headers (NSH) for the flow switches to classify. The information provided by the PCRF to the PCEF could be application information—and the PCEF should use DPI capabilities to classify the flows pertaining to that application—or 5-tuple or classification based on Uniform Resource Locator (URL), these are preconfigured into the PCRF or fed via ad-hoc interfaces (i.e. REST) using additional DPI functions.

Hence, with reference to FIG. 1, it shall be noted that if an OTT is involved, there are 2 paths to reach the SDNc-P: 1) OTT→AF→PCRF→SDNc-P and 2) OTT→SCEF/PFDF→PCEF→SDNc-P. Moreover, if an OTT is not involved, the PCEF has to hold initial PCEF classification rules, which may be obtained via e.g. local PCEF configuration or traffic inspection. The traffic filters (5-tuples or others) extracted in the PCEF then have to reach the SDNc-P and there are existing mechanisms for this purpose. For instance, Application and Detection Control (ADC) between the PCEF and the PCRF may be used to report 5-tuples per application/OTT over the Gx interface.

In summary, if the OTT is not providing the classification rules, the classification rules have to come from the PCEF via manual configuration, e.g. by a network operator, or via some kind of DPI that can extract 5-tuples to be used as classification rules.

In another scenario, there is no OTT but classification rules are inserted directly—manually—into the PFDF. The PFDF can contain information from OTTs but also introduced by the operator, making the PFDF a central classification repository. However, this is conceptually the same case as having an OTT. The PFDF can have OTT classification rules retrieved dynamically from an OTT, retrieved offline from an OTT and entered manually into the PFDF and also not retrieved from OTT but defined by the operator, i.e. the same as when defined in PCEF.

According to the existing approaches, OTT classification rules are provided by the OTT. The following JavaScript Object Notation (JSON) shows an example of OTT classification rules that Facebook, as an example of an OTT, is making available to partners, vendors and operators. This information is shared via a Hypertext Transfer Protocol (HTTP) based Application Programming Interface (API), protected with some credentials.

```
{
    "category": "iorg",
    "dns_patterns": [
        {
            "patterns": [
                "fb.me",
                ...
            ],
            "type": "FACEBOOK"
        },
        {
            "patterns": [
                "*.operamini.com",
                ...
            ],
            "type": "OPERA"
        },
        {
            "patterns": [
                "kwurl.ucweb.com",
                ...
            ],
            "type": "UC"
        }
    ],
    ...
```

There is a section called "dns_patterns" that contains a list of 3 "patterns" ("FACEBOOK", "OPERA", "UC") with a list of sub-entries each. In the specific case of Ericsson's Packet Data Network Gateway (EPG), as an example of the PCEF, this should be mapped to three lists of domain header rules:

(config)
ManagedElement=1,Epg=1,Pgw=1,ServiceIdentificaion=1,HeaderRule=ruleName,Term=termId,From=1,Domain=1 in a service-set associated to an Access Point Name (APN).

Facebook also provides "pool_configs", which are lists of IPv4 or IPv6 subnets, the JSON containing several of these. The "pool_configs" should be mapped in case of EPG to network addresses header rules:

(config)
ManagedElement=1,Epg=1,Pgw=1,ServiceIdentification=1,HeaderRule=headerRuleName,Term=termId,From=1,networkAddress=[address]

Finally, the OTT classification rules provided by Facebook can overlap and the order is relevant; Facebook specifies that rules appearing on top in the JSON should have more priority. Rules on the top of the JSON tend to be more specific and rules appearing at the end tend to be more general, but in case of overlapping the order provides the priority. The EPG can implement this priority based model and also assume more priority to rules on top of the configuration, but other PCEFs might need adaptations to comply with this requirement.

This example is regarding Facebook, but a PFDF is expected to work with more than one OTT and as such the semantics of each OTT should be understood. For instance, both Whatsapp and Opera provide subnet lists without an API, just publishing them on the web (also, no credentials required). In this case there is no priority and the subnets provided stay on a flat configuration space, in EPG this can be configured via a set of "networkAddress" header rules.

Furthermore, Youtube provides lists of subnets and SNI (Server Name Indication, a field in the Transport Layer Security (TLS) negotiation) that have to be logically ANDed to achieve classification. In EPG this can be done by concatenating "networkAddress" header rules with Secure Socket Layer (SSL)/TLS analyzer rules. Youtube does not provide an API for this (currently using docs or pdfs via email) so maybe this information can be hardcoded in the PFDF or the PFDF vendor can provide an API to gather the OTT classification rules from OTTs without an API.

So far only EPG, that acts as a PCEF, has been mentioned but potentially the network could decide to implement only one PFDF in a multi-vendor core, with Packet Data Network Gateways (PGWs)/PCEFs from several vendors. Since the PCEF classification rules on each PCEF are proprietary and they are not standardized, a PFDF should do the conversions or adaptations above for each PCEF model or vendor. The conversions presented are valid for EPG but other should be provided for other vendors as well.

Therefore, the role of the PFDF is to:
handle access—credentials—to as many OTTs as possible to do this in real time and notice changes in the OTT provided rules/APIs
understand the semantics of each set of OTT classification rules
understand the semantics of as many PCEFs as possible, and finally
have the capability of converting OTT classification rules into PCEF classification rules and installing them in a number of PCEF instances.

In view of the above, it is seen that the Dynamic Service Chaining in SDN is useful for steering data flows to different Service Functions with different granularity, such as per subscriber. Disadvantageously, an OTT is limited to the aforementioned manners of providing OTT classification rules to the DSC.

SUMMARY

An object may be to improve flexibility concerning how at least one classification configuration, such as one or more OTT classification rules, may be provided, e.g. by an OTT, for purposes of dynamic service chaining.

According to an aspect, the object is achieved by a method, performed by a classification configuration module, for managing a classification configuration for traffic, related to a service, in a software defined network. The classification configuration module receives the classification configuration from a service related module. The classification configuration includes a first indication indicating a traffic treatment for the traffic, and a second indication identifying the traffic to be treated according to the first indication for traffic treatment. Moreover, the classification configuration module determines, based on the classification configuration, a set of traffic filters for use by a software defined network controlling module to determine a list of service functions implementing the traffic treatment for the traffic. Furthermore, the classification configuration module transmits information relating to the set of traffic filters to the software defined network controlling module.

According to another aspect, the object is achieved by a classification configuration module configured for managing a classification configuration for traffic, related to a service, in a software defined network. The classification configuration module is configured for receiving the classification configuration from a service related module. The classification configuration includes a first indication indicating a traffic treatment for the traffic, and a second indication identifying the traffic to be treated according to the first indication for traffic treatment. The classification configuration module is further configured for determining, based on the classification configuration, a set of traffic filters for use by a software defined network controlling module to determine a list of service functions implementing the traffic treatment for the traffic. Moreover, the classification configuration module is configured for transmitting information relating to the set of traffic filters to the software defined network controlling module.

According to further aspects, the object is achieved by a computer program and a computer program carrier corresponding to the aspects above.

Thanks to that the classification configuration module, such as a module implementing the PFDF mentioned above, receives the classification configuration from the service related module, the classification configuration module is made aware of the classification configuration imposed by the service related module, such as an OTT, an OTT Control or the like. The classification configuration may be received by the classification configuration module over a custom interface. The classification configuration module then uses the classification configuration, e.g. the first and second indications included therein, to determine a set of traffic filters for use by the software defined network controlling module. Subsequently, the classification configuration module transmits information relating to the set of traffic filters to the software defined network controlling module, which e.g. applies the traffic filters in order to treat the traffic as imposed by the service related module.

In this manner, the embodiments herein implement an interface for communication between the classification configuration module, functioning as a classification rule repository function, and the software defined network controlling function, such as a Traffic Steering Support Function (TSSF), an SDN controller, a SDNc-P or the like.

An advantage is that the interface allows the classification configuration module to function as a central repository for local, static as well as dynamic network-wide classification configurations, such as classification rules, across a network, such as a software defined network. In this manner, misalignments concerning the classification configuration is reduced, or even eliminated.

Further benefits and advantages will be apparent from the following detailed description.

BRIEF DESCRIPTION OF THE DRAWINGS

The various aspects of embodiments disclosed herein will be readily understood from the following detailed description and the accompanying drawings, in which.

DETAILED DESCRIPTION

In order to better appreciate the embodiments disclosed herein, the following further information related to software defined networks is provided.

Within standardization and also for operators and equipment manufacturers different realms of competence, functionality and responsibility exist. The different realms sometimes lead to the development of separate functionality and products that, without that separation of responsibilities, could otherwise cooperate to deliver improved solutions. Two of such realms are Packet Core, whose responsibilities include PCC (Policy Charging and Control), and SDN, implementing Dynamic Service Chaining (DSC).

As part of PCC, Third Generation Partnership Project (3GPP) has worked with improving access to classification rules by allowing third party Content Providers, such as OTTs, to share classification configuration(s), e.g. the OTT classification rules, with a network via two functions; SCEF and PFDF.

A concept behind this work is to provide a standardized framework that would allow Content Providers to feed OTT classification rules to the network, such as SDN. The OTT classification rules, e.g. classification rules currently left out of the standard, would enable the network to deal with use cases concerning Policy and Charging, like for instance free-rating or zero-rating, and thus leave specific traffic flows out of the main policy quota bucket so that the traffic is "free" and not rated. Content providers may refer to video delivery websites, social applications, or Content Delivery Networks. Classification rules may include 5-tuples, e.g. source and destination IP addresses and ports, and also transport protocol type, URLs and the like. The traffic, or data, that is free-rated, sometimes be referred to as "sponsored data", appear in multiple uses cases, like e.g. free-rated access to Wikipedia to improve literacy levels in some developing countries.

Figure 2:
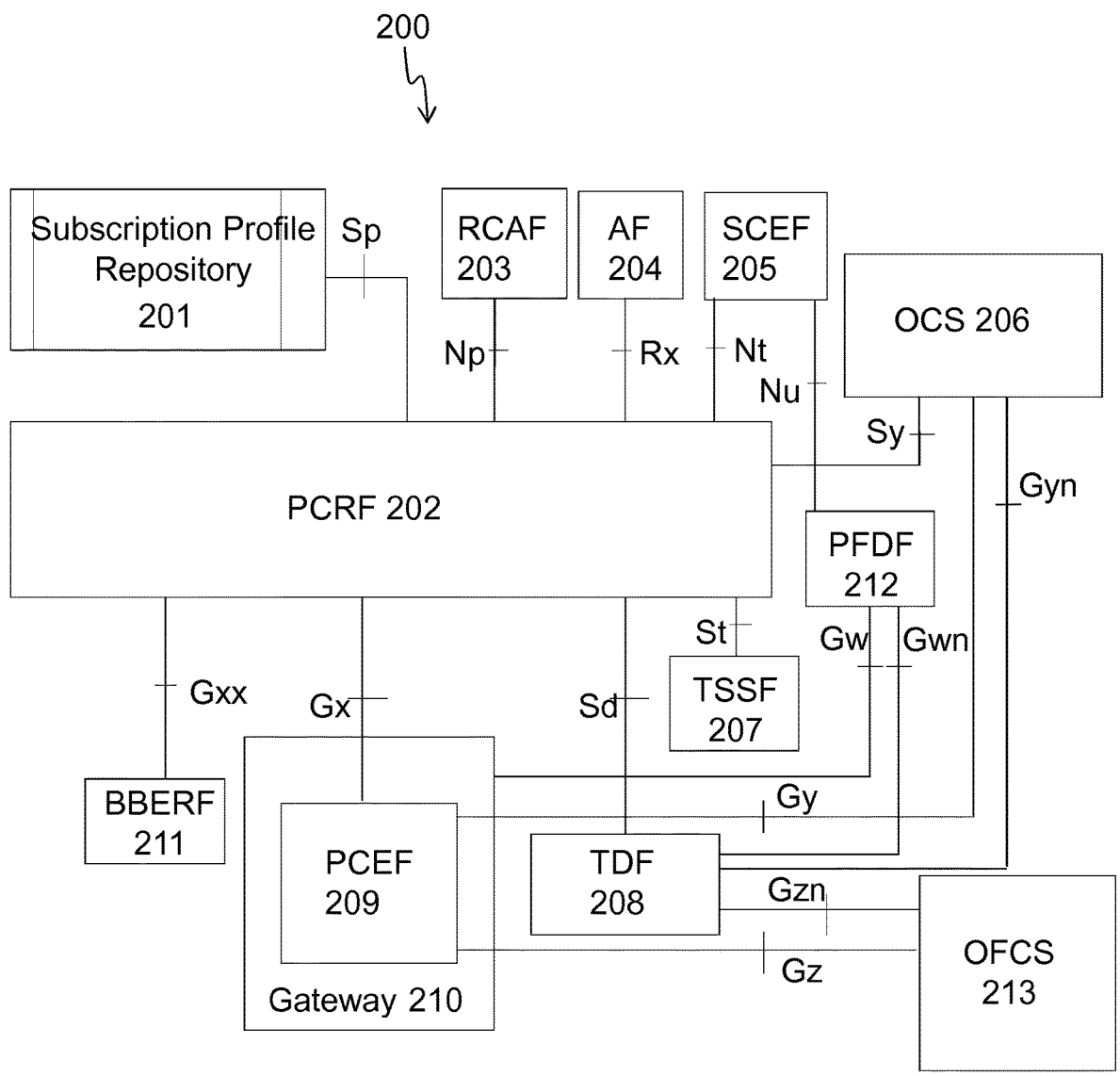
FIG. 2 is another overview of an exemplifying system according to prior art.

FIG. 2 shows an overview of a system 200 according to the aforementioned standardization work, i.e. 3GPP Rel 14 Sponsored Data Connectivity Improvements (SDCI).

A Subscription Profile Repository (SPR) 201 is connected via a Sp interface to a PCRF 202. A Radio Access Network (RAN) Congestion Awareness Function (RCAF) 203 is also connected to the PCRF 202 but via an Np interface. Furthermore, an AF 204 is also connected to the PCRF 202 but via an Rx interface. A SCEF 205 is also connected to the PCRF 202 but via an Nt interface. An Online Charging System (OCS) 206 is also connected to the PCRF 202 but via an Sy interface. A TSSF 207 is also connected to the PCRF 202 but via an St interface. Moreover, a TDF 208 is also connected to the PCRF 202 but via an Sd interface. A PCEF 209, which may be included in a gateway 210, such as a PGW, is also connected to the PCRF 202 but via a Gx interface. Finally, a Bearer Binding and Event Reporting Function (BBERF) 211 is also connected to the PCRF 202 but via a Gxx interface.

Furthermore, the SCEF 205 is connected to a PFDF 212 via an Nu interface, the PFDF 212 is connected to the gateway 210 via an Gw interface and the PFDF 212 is also connected to the TDF 208 via an Gwn interface.

Moreover, the OCS 206 is connected to the PCEF 209 via a Gy interface and the TDF 208 via a Gyn interface. An Offline Charging System (OFCS) 213 is similarly connected to the PCEF 209 via a Gz interface and the TDF 208 via a Gzn interface.

Now returning to an example relating to Wikipedia, produced by Wikimedia Foundation, the following scenario may be considered. Assume that Wikimedia feeds IP addresses, such as 5-tuples, to operators by use of the SCEF 205 which each operator would make available to Wikimedia. Once Wikimedia is authenticated to use the SCEF 205 of one particular operator and the IP addresses used by the Wikipedia website are exchanged, the SCEF 205 uses the Nu interface with the PFDF 212 to store those OTT classification rules, i.e. the IP addresses in this example. The PFDF 212 then uses the Gw and Gwn interfaces to update the PCEF/TDF classification rules in the PCEF 209 and/or TDF 208 which should be able to successfully classify traffic for the Wikipedia website according to the OTT classification rules provided by Wikimedia to the network.

The SCEF 205 defined in SDCI is essentially an Application Programming Interface (API) towards the OTT with some security functionality, like firewalling and access control. The SCEF 205 can interface with the PCRF 202 for use cases to be defined in the future and with the PFDF 212 to store classification rule information. The SCEF 205 is otherwise not much more relevant in this scenario. The main responsibilities for the SCEF 205 include verifying that only authorized third parties are allowed to share classification rules with the network and that the other nodes and functions within the network are protected from malicious accesses.

When the SCEF 205 and PFDF 212 are implemented in the same node, the Nu interface may be an internal interface within that same node. Therefore, the Nu interface will not be discussed further herein.

The PFDF 212 receives OTT classification rules—in the form of classification configuration—provided by the different OTTs via the SCEF 205, acts as classification rule repository and will potentially store network-wide classification rules, derived from the received OTT classification rules and to be implemented in some—potentially all—PCEFs and TDFs of the network. The PFDF 212 thus shares the OTT classification rules with the PCEFs and the TDFs in the form of converted or derived PCEF/TDF classification rules—via the new Gw and Gwn interfaces. The PFDF 212 will potentially handle local classification configuration as well, that is classification rules provided by the network administrator and independent of the classification rules provided by the different OTTs via the SCEF 205. In those scenarios, and even if no local classification rules are provided, the PFDF 212 acts as a central point for network-wide classification rule storage, distribution, synchronization and also verification and maintenance.

There are at least two differences between the PFDF 212, or classification rule repository, and existing AFs 204.

A first difference is that the PFDF 212 has a network-wide scope, while the AFs 204 address traffic on a per subscriber or subscriber group approach. Hence, the PFDF 212 does not require a subscriber dimension. Moreover, the PFDF 212 stores classification rules that are static—designed to remain unchanged for days, weeks or even months—and common to all traffic going to and/or coming from the OTT, regardless of the subscriber and even regardless of the network, i.e. different networks may share the same classification rules in the PFDF 212 for the same OTT.

A second difference is related to that the PFDF 212 uses network-wide classification rules while the AFs use subscriber-related classification rules. The network-wide classification rules are generic rules that, if applied, will apply to all subscribers and that can be designed to match any parameter of any protocol of the protocol stack, such as network, transport, or application layer, and that will remain constant for extended periods of time as expressed above. The subscriber-related classification rules at the AF, on the other hand, are generally expressed in the form of 5-tuples, such as source and destination IP addresses, transport ports and transport protocol, are specific to one subscriber and last for as long as the traffic matching the 5-tuple exists on the network.

Figure 1:
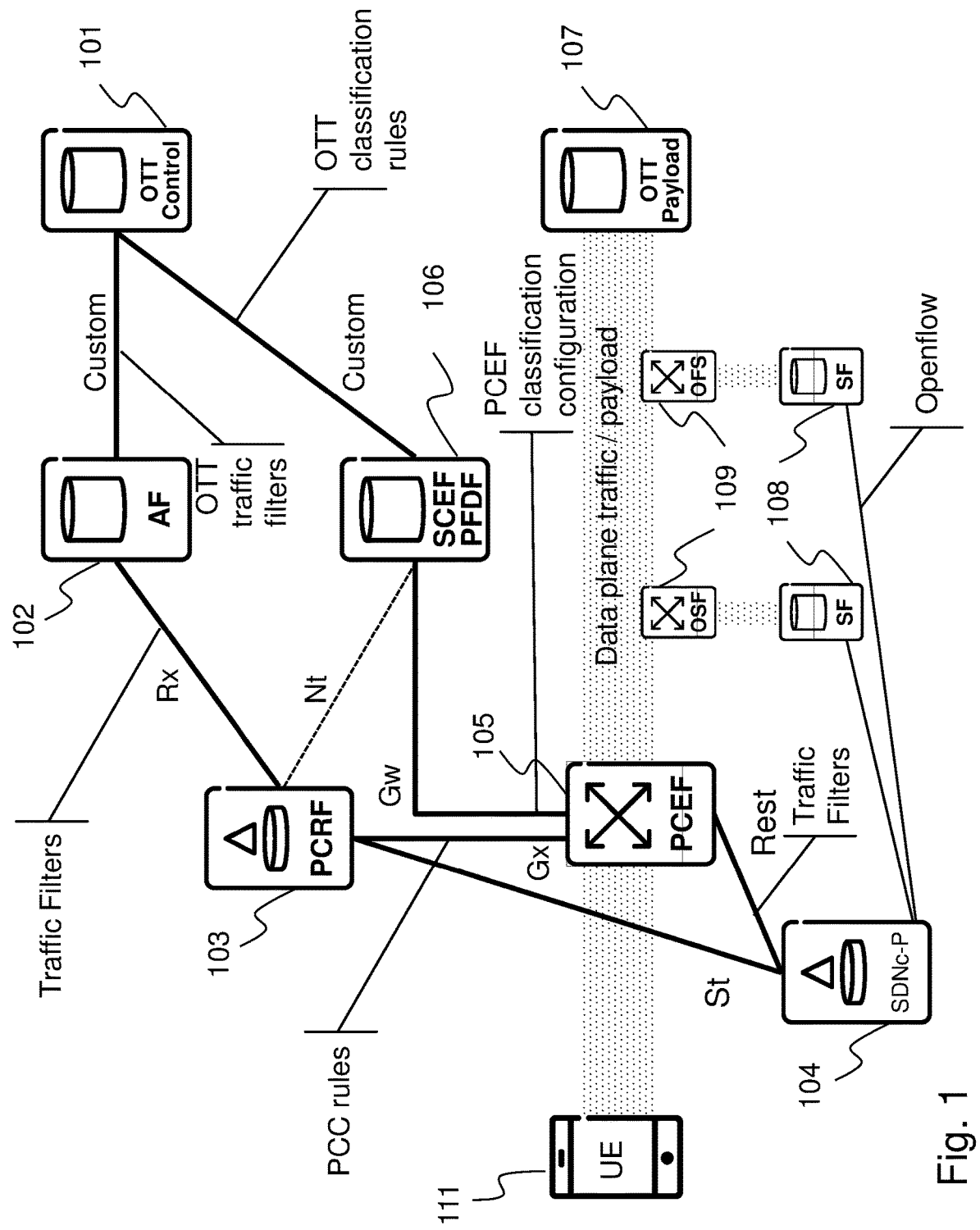
FIG. 1 is an overview of an exemplifying system according to prior art.
Figure 3:
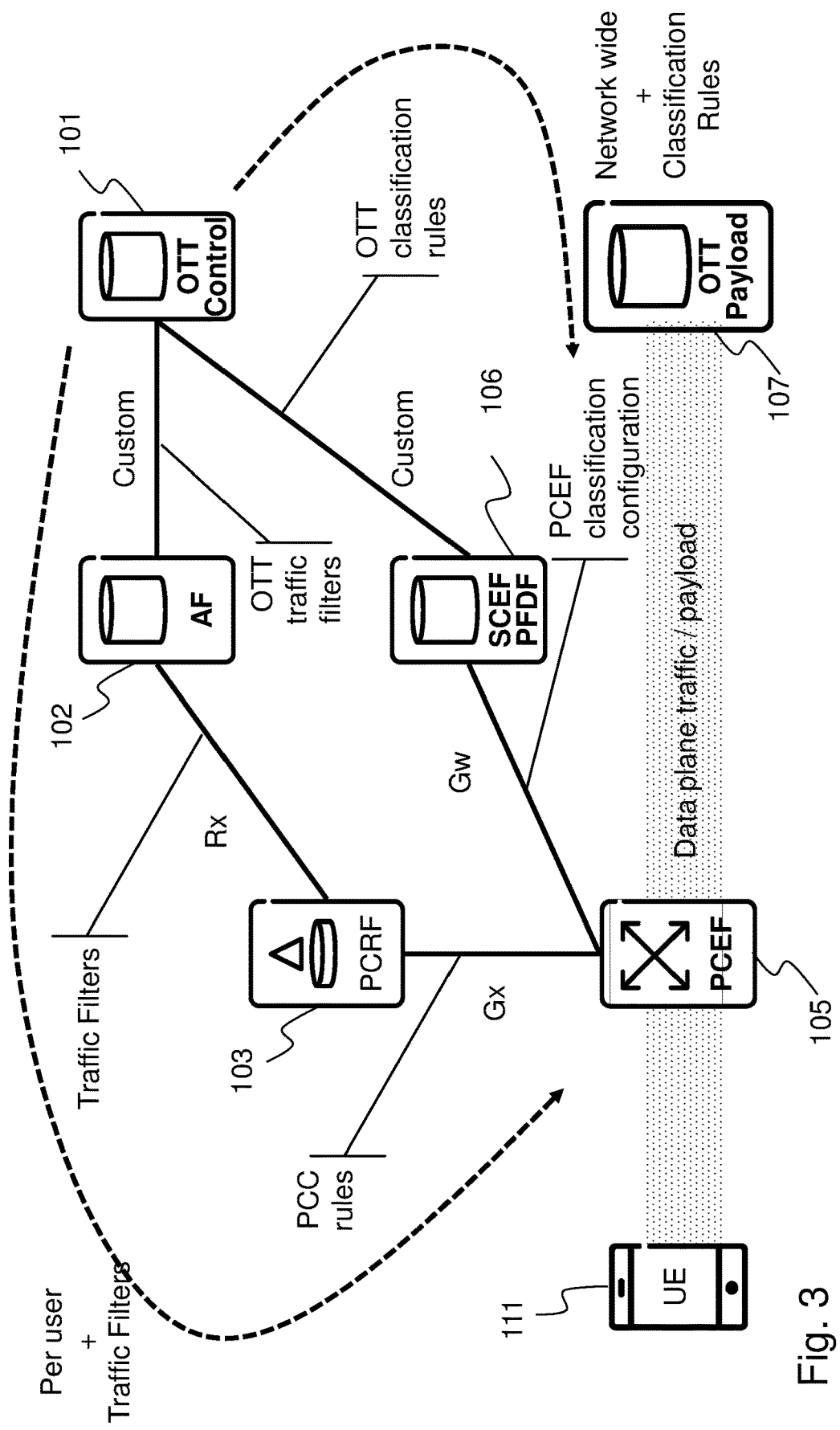
FIG. 3 is a further overview of an exemplifying system according to prior art.

FIG. 3 depicts two paths for OTT collaborations, i.e. via AF and Rx and via SCEF/PFDF using Gw/Gwn interfaces. The same or similar entities and functions as in FIG. 1 are illustrated using the same reference numerals as in FIG. 1 when applicable. Description of these entities and functions are omitted for simplicity.

In FIG. 3 and throughout this disclosure, OTT Control represents a portion of the OTT implementation that feeds a network, i.e. a PFDF of the network, with OTT classification rules. It is depicted differentiated from the OTT Payload that delivers content to the subscribers but no assumption is made on how this is implemented in the OTT. This means that the OTT Payload and the OTT Control functions may or may not be separate entities depending on choice of implementation.

The two paths impose different constraints on the information being exchanged.

Using the path via AF and via PCRF, the OTT/PCRF/PCEF classification rules may be provided in the form of traffic filters and one traffic filter per subscriber is required. Therefore, the custom interface between the OTT Control and the AF should be a per subscriber interface, in the same way as the Rx and Gx interfaces are per subscriber. Also, for each subscriber, a session of the relevant protocol, such as Rx, Gx and custom AF-OTT Control, should be established and if the traffic filters are expressed with different semantics conversions should be made. Furthermore, in this path there is no concept of traffic filter repository. This means that any modification in the network, e.g. due to transmission problem on the control plane, node restart or the like, will require a complete synchronization of all traffic filters for all subscribers, since no memory, such as a storage or repository for traffic filters, is available for this purpose.

The other path via the SCEF/PFDF is based on network-wide classification rules and does not include a subscriber dimension. The interfaces between the SCEF/PFDF and the PCEF/TDF, e.g. Gw and Gwn, can be simplified since only one session per node is required and the subscriber dimension is not needed. The PFDF acts as classification rule repository so any loss of synchronization on the PCEF or TDF, due to e.g. a crash, a reboot or the like, will be addressed by synchronizing the classification rules from the PFDF. That is, the OTT does not need to re-send the classification configuration in case of synchronization loss. It is preferred that the PFDF provides functionality for converting the classification rule(s) between the formats used by the OTT Control, i.e. format of the classification configuration, and the PCEF, i.e. format of the PCEF classification rules. This functionality is needed anyway since the OTT Controls operated by different OTTs may use different semantics. Accordingly, not all OTTs will provide classification rules to the network in the same format; it is expected that each OTT will use its own format.

Concerning the aforementioned Nt interface between the SCEF and the PCRF, it may be noted that this interface does not provide for any communication interface between the SCEF and the PFDF even if the SCEF and the PFDF are co-located. Since the SCEF has no role other than access control and firewalling, the Nt interface can convey OTT classification rules to the PCRF in raw format, but these OTT classification rules will be ignored by the PCRF as it would require the PCRF to act as the PFDF, i.e. a classification rule repository. This would imply that the PFDF function is integrated into the PCRF, which would make no significant difference to the problem discussed and only address the deployment of the functionalities. Also, in this scenario, the Nt interface would transmit OTT classification rules which are not converted so the PCRF would receive different formats from different OTTs. This would require the PCRF to be aware of different formats for different OTTs, which clearly isn't a desired dependency.

In the same way as the PFDF interacts with the PCEF, the PFDF may preferably also interact with the SDNc-P, or with the SDN architecture in general. At a high level, and if the SDN infrastructure needs to be service aware, there are two options. A first option is that the network inspects traffic and infers and reports—ultimately—five tuples. A second option is that the PFDF collects classification configuration, i.e. OTT classification rules, directly from the OTT(s) and feeds this information to the SDN in the form of traffic filters usable to determine a list of service function for a type of traffic. According to the second option, the PFDF may gather information, e.g. in multiple formats, from one or more OTTs. The PFDF may then adapt the information to capabilities of the SDN network, which may be from one or several vendors. The embodiments herein provide one or more solutions for the second option.

Figure 4:
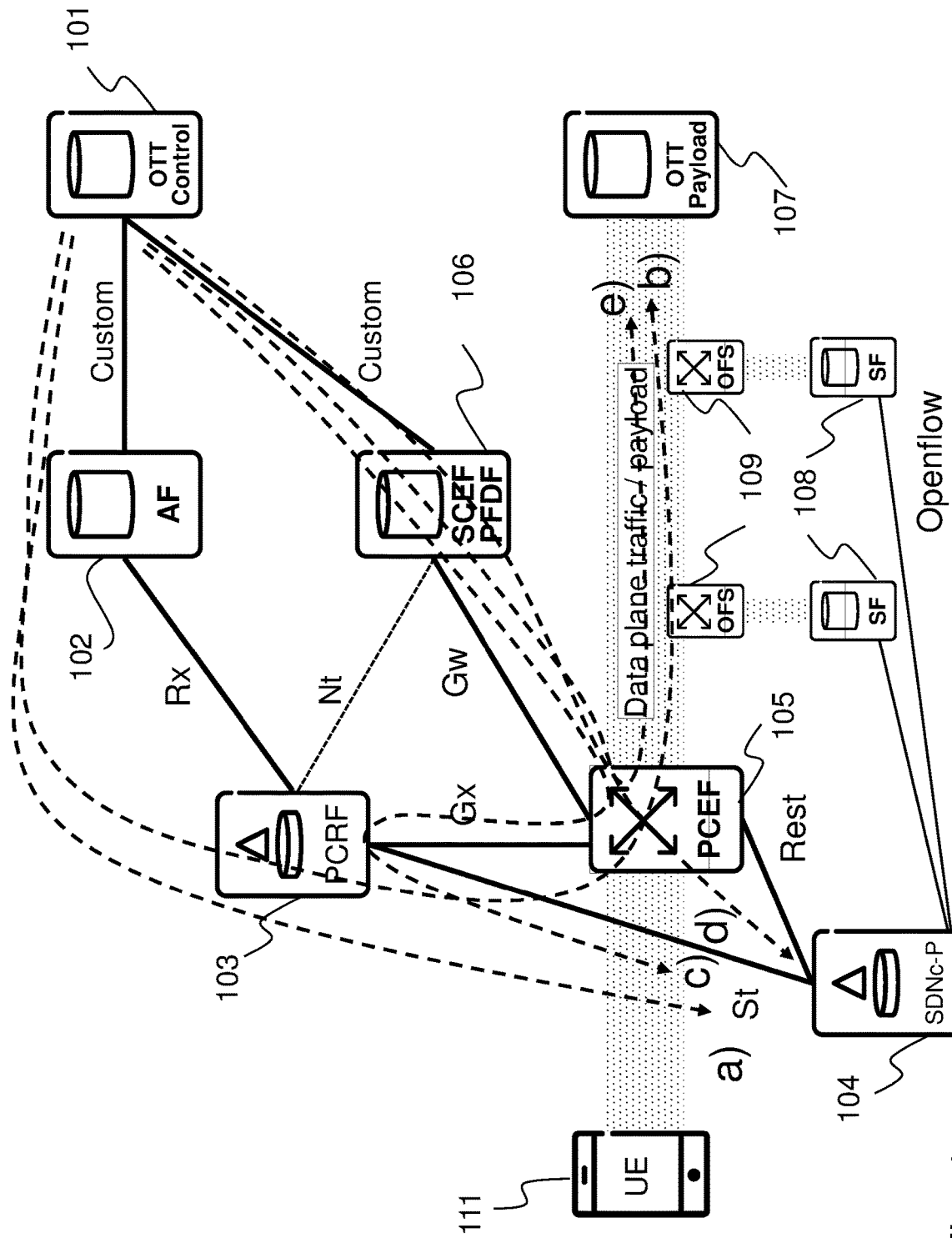
FIG. 4 is yet another overview of an exemplifying system according to prior art.

FIG. 4 illustrates five paths for providing Dynamic Service Chaining with OTT collaboration. Again, the same or similar entities and functions as in FIG. 1 are illustrated using the same reference numerals as in FIG. 1 and FIG. 3 when applicable. Description of these entities and functions are omitted for simplicity again.

Path a) represents per subscriber classification rule, e.g. traffic filter, path from the AF to the PCRF to the SDNc-P.

Path b) represents per subscriber classification rule, e.g. traffic filter, path from the AF to the PCRF using NSH header marking in the PCEF.

Path c) represents network-wide classification rule with classification done in the PCEF or TDF and traffic filters reported to the PCRF and then sent to the SDNc-P via St interface.

Path d) represents network-wide classification rule with classification done in the PCEF or TDF and traffic filters reported directly to the SDNc-P.

Path e) represents network-wide classification rule with classification done in the PCEF or TDF and NSH header marking directly on the subscriber payload.

The following table summarizes the impacts of the different paths a) through e).

TABLE 1

Impacts of paths a) through e).

| Technique | Number of nodes impacted | Traffic classification required | Openflow or NSH |
|---|---|---|---|
| a) | 3 AF, PCRF, SDNc-P | No | Openflow |
| b) | 3 AF, PCRF, PCEF | Yes | NSH |
| c) | 4 PFDF, PCEF, PCRF, SDNc-P | Yes | Openflow |
| d) | 3 PFDF, PCEF, SDNc-P | Yes | Openflow |
| e) | 3 AF, PFDF, PCEF | Yes | NSH |

Accordingly, for Dynamic Service Chaining, the SDNc-P can retrieve traffic filters from the network via DPI techniques. Moreover, Dynamic Service Chaining can use pre-configured traffic filters, such as 5-tuples or URLs. Finally, traffic filters can be obtained, by the DSC, from OTT Content Providers when provided in the form of traffic filters via an AF and expressed per subscriber.

Independently of Dynamic Service Chaining as described above, Sponsored Data Collaboration Improvements (SDCI) has been proposed by 3GPP. The Sponsored Data Collaboration Improvements allow for the reception of classification rules from third party OTTs, such as Content Providers or the like, for purposes of Policy and Charging Control. The SDCI is implemented in the PCEF (and/or the TDF), but there is no possibility to influence Dynamic Service Chaining with these classification rules received from the third party OTT on a network-wide basis.

This means that the classification rules stored in the PFDF and provided by third party OTTs cannot be used—according to prior art—for Dynamic Service Chaining in SDN. In order to use the classification rules stored in the PFDF, it would be required that traffic classification is implemented in the PCEF or TDF as well as that the traffic filters are reported directly to the SDNc-P or via the PCRF. This would only be required in order to provide conversion from OTT classification rules into traffic filters. Hence, it would be an inefficient and expensive way of enabling DSC in SDN with OTT collaboration.

Moreover, regarding preconfigured or static classification rules, specific to each network, solutions according to prior art do not allow for a single point of definition of the classification rules converted from the OTT classification rules. While the PFDF seems to be a natural place to store, maintain, verify, translate, convert and distribute both classification rules, being dynamic as well as local, and static classification rules, e.g. defined by an operator of a network, there is no mechanism to use these classification rules in SDN use cases. Any implementation would require that the traffic is classified in the PCEF or TDF using the rules therein and that the traffic filters are reported to the SDNc-P or PCRF. In some existing solutions for Dynamic Service Chaining, the traffic filters required are supposed to be stored in the PCRF. Disadvantageously, rule definitions are duplicated, i.e. both in the PFDF for network-wide PCC use cases and in the PCRF for SDN use cases.

In view of the above, solutions according to prior art present the following drawbacks.

Some of the solutions according prior art require that traffic is classified in order to make conversion from network-wide classification rules into traffic filters. Disadvantageously, it is computationally expensive to classify the traffic.

When per subscriber classification rules are used, all interfaces and reporting of traffic filters is required to be implemented per subscriber. Thus, signaling impact is multiplied according to number of subscribers. No benefit is brought by the per subscriber classification rules in this case since all traffic filters that are derived from network-wide classification rules will be the same for all subscribers. This is by consequence since the original information is network-wide without any subscriber dimension. Therefore, the per subscriber classification rules, and corresponding per subscriber traffic filters, only repeat the network-wide classification rules. Moreover, not all OTT control functions may provide per subscriber OTT classification rules and may only provide network-wide classification rules for performance and simplicity reasons.

Generally, some solutions according to prior art, use many functions where each of them adds only little value. A simplified solution would allow for a cheaper implementation and faster time to market.

Throughout the following description similar reference numerals have been used to denote similar features, such as nodes, actions, modules, circuits, parts, items, elements, units or the like, when applicable.

Moreover, in view of the foregoing and subsequent description, the following terms are explained.

As used herein, the term "classification configuration" may refer to information, provided by the OTT to the PFDF, in order to configure classification of traffic, e.g. on a network wide basis. In this manner, the service chain may be adapted dynamically. The term "OTT classification rule(s)" may have an equivalent meaning.

As used herein, the term "classification rule(s)" may refer to information provided to the PCEF and/or the PCRF, i.e. PCEF classification rule(s) and/or PCRF classification rule(s).

As used herein, the term "traffic filter" may indicate a subset of the classification rules, such as 5-tuple, URLs or the like, which may be applied on a network wide basis. Notably, in e.g. PCC architecture literature, the term "traffic filter" may have a meaning limited to applying per subscriber basis.

As used herein, the term "Openflow match filter" or "match filter" are given as examples of traffic filters that are accepted by openflow switches.

Figure 5:
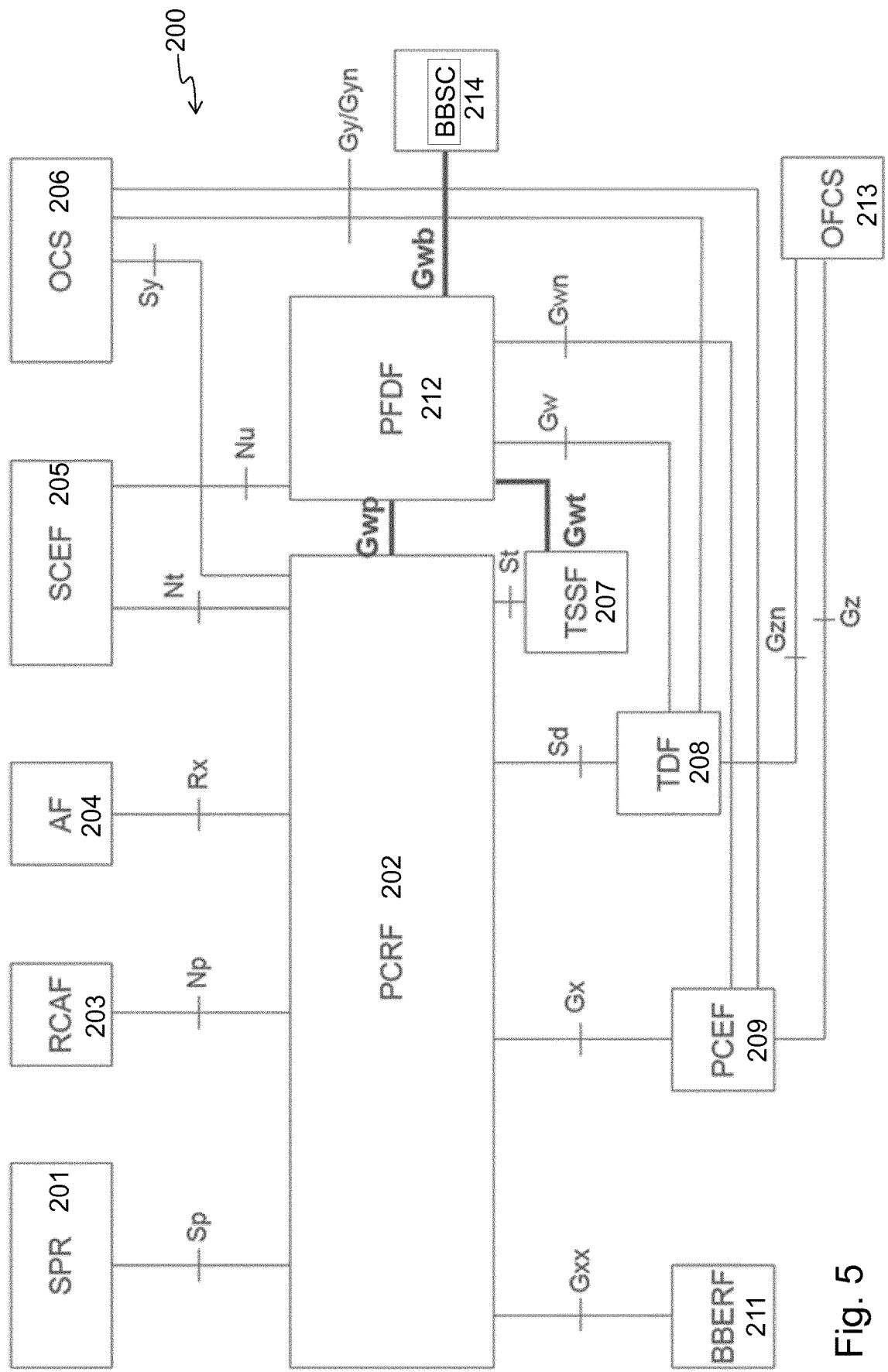
FIG. 5 is an overview of a system according to embodiments herein.

FIG. 5 depicts the exemplifying system 200 of FIG. 2. The system 200 illustrates functions and/or entities responsible for PCC and DSC in SDN according to 3GPP. In order to avoid undue repetition, reference is made to FIG. 2, which is similar to FIG. 5. In addition to the entities and functions described in relation to FIG. 2, FIG. 5 further illustrates a Broadband Service Controller (BBSC) 214.

It shall, however, be noted that FIG. 5 further illustrates three interfaces, referred to herein as Gwt-interface, Gwb-interface and Gwp-interface, respectively. Since the Gwt-interface and Gwb-interface are similar, the following description will describe the Gwt-interface, but the same or similar description is also applicable to the Gwb-interface.

Figure 6:
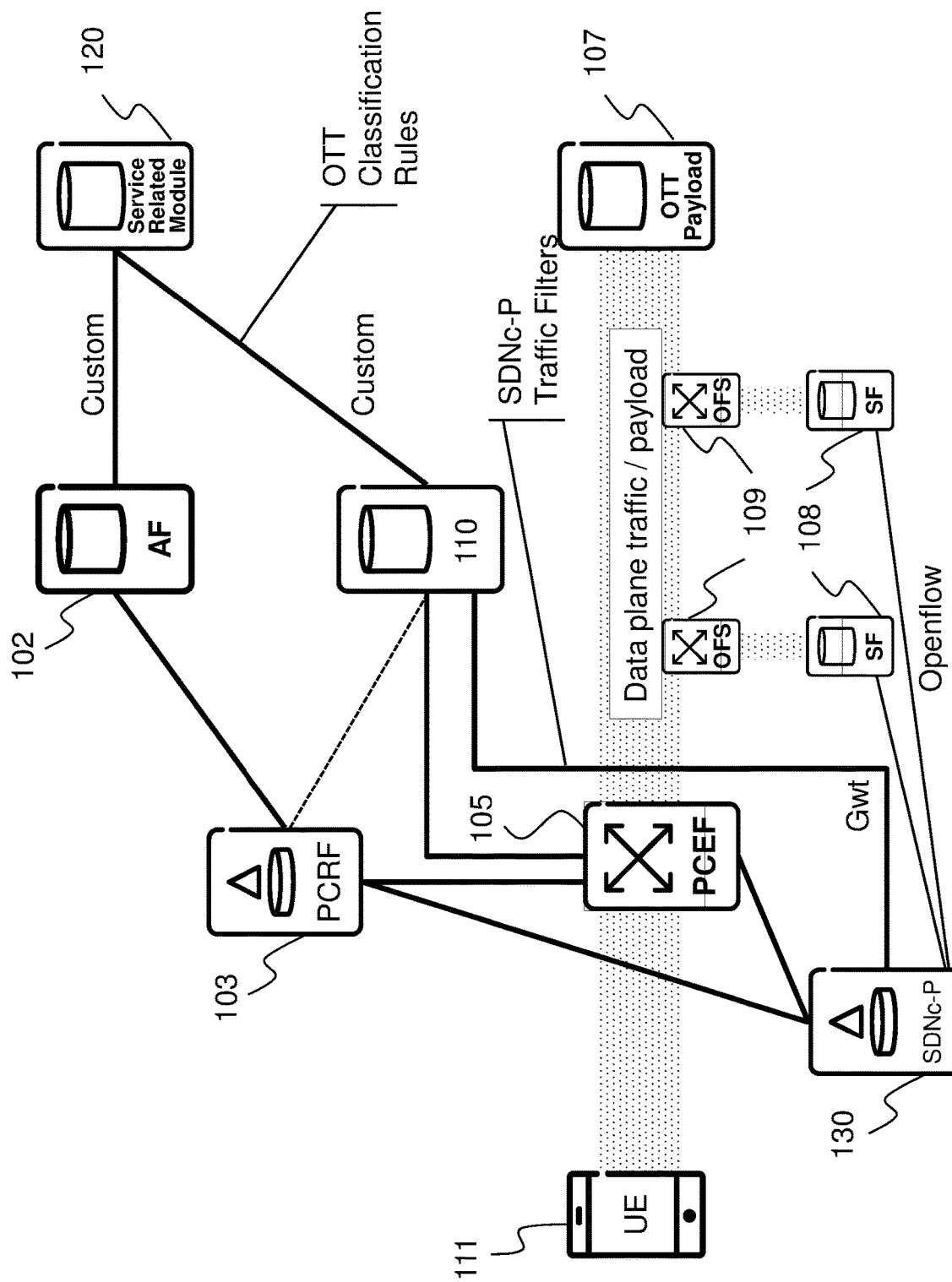
FIG. 6 is another overview of a system in which embodiments herein have been implemented.

In FIG. 6, a schematic overview of a portion of FIG. 5 is illustrated in order to more clearly present the Gwt-interface. Again, the same or similar entities and functions as in FIGS. 1, 3, 4 and 5 are illustrated using the same reference numerals as in FIGS. 1, 3, 4 and 5 when applicable. Description of these entities and functions are omitted for simplicity again. FIG. 6 also illustrates a classification configuration module 110, such as a PFDF, a classification rule repository or the like.

Figure 7:
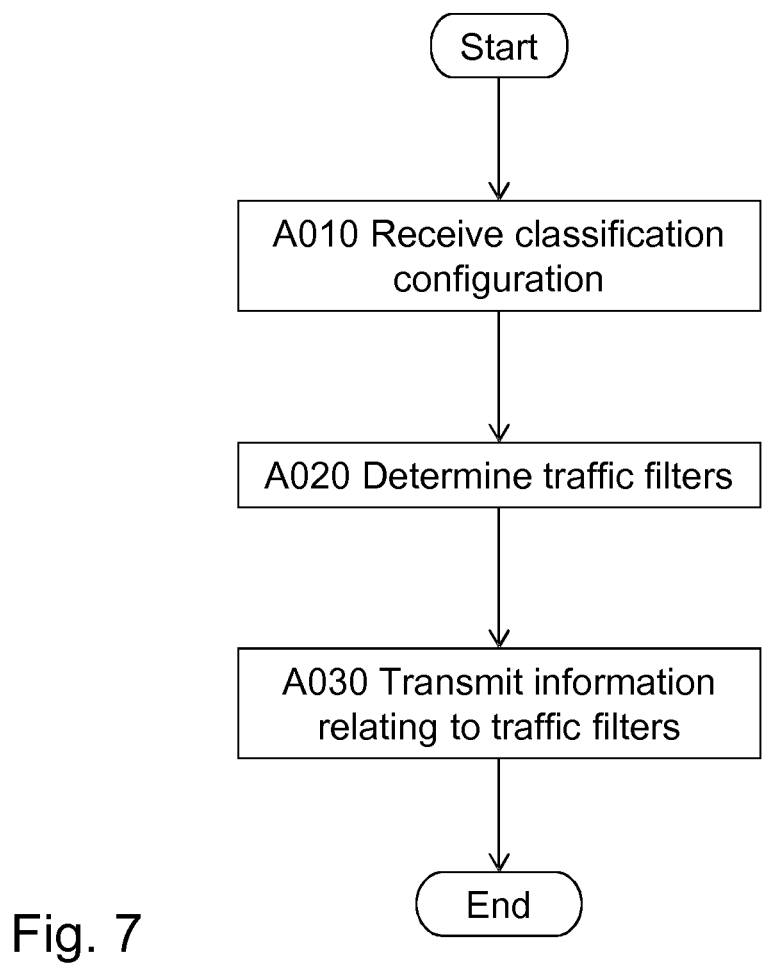
FIG. 7 is a flowchart illustrating embodiments of the method in the classification configuration module.

FIG. 7 illustrates exemplifying methods according to embodiments herein when implemented in the system of FIG. 6. The exemplifying methods are performed by the classification configuration module 110. In more detail, the classification configuration module 110 performs a method for managing a classification configuration for traffic, related to a service, in a software defined network.

The classification configuration module 110 may be a Packet Flow Description Function module, i.e. a module implementing the PFDF, or the like.

The service related module 120 may be any one of an OTT related module, a SCEF module, i.e. a module implementing the SCEF, and the like.

The software defined network controlling module 130 may be anyone of an SDN, controller, a TSSF module, i.e. a module implementing the TSSF, and the like.

One or more of the following actions may be performed in any suitable order.

Action A010

The classification configuration module 110 receives the classification configuration from a service related module 120, wherein the classification configuration includes a first indication indicating a traffic treatment for the traffic, and a second indication identifying the traffic to be treated according to the first indication for traffic treatment.

The first indication may indicate any one of optimizing, forwarding, converting, redirecting, resource allocating, differentiating charging, and the second indication may identify anyone of a traffic type, a protocol, a destination, a domain, a Uniform Resource Locator, URL, a server name indication, SNI, and a service.

Action A020

The classification configuration module 110 determines, based on the classification configuration, a set of traffic filters for use by a software defined network controlling module 130 to determine a list of service functions implementing the traffic treatment for the traffic, i.e. all traffic related to the service. Hence, the treatment is network-wide, but only for traffic of the service.

As an example, the classification configuration module 110 may determine the set of traffic filters by identifying a mapping for the second indication and applying the mapping to the second indication to obtain the set of traffic filters. The mapping for the second indication maps indications identifying the traffic to traffic filters that filters out traffic identified by the indications. Expressed differently, the determining A020 of the set of traffic filters comprises identifying a mapping for the second indication, and applying the mapping to the second indication to obtain the set of traffic filters. See also section "Gwt and Gwb interfaces" below.

The set of traffic filters may comprise Open Flow match filters usable by the software defined network controlling module 130 to construct a service chaining on Open Flow switches to forward matching traffic towards a set of service functions.

Action A030

The classification configuration module 110 transmits information relating to the set of traffic filters to the software defined network controlling module 130.

As an example, the classification configuration module 110 may transmit the information relating to the set of traffic filters by transmitting the first indication and the second indication. Expressed differently, the transmitting A030 of the information relating to the set of traffic filters may comprise transmitting the first indication indicating the traffic treatment for the traffic, and the second indication identifying the traffic to be treated according to the first indication for traffic treatment.

The information relating to the set of traffic filters may comprise at least one of a set of identifiers of the set of traffic filters and the set of traffic filters.

Thanks to the embodiments of the method described above, interfaces between the classification rule repository function, such as the PFDF module, may be implemented. The interfaces may handle both static and local, operator or network defined network-wide classification rules, and third party dynamic OTT classification rules—and the different elements of the SDN solution.

The combination of dynamic and static classification rules can be then shared with PCEFs and TDFs for Policy and Charging use cases or with PCRFs, TSSFs (SDNc-P) and BBSCs for Service Chaining use cases.

While the PFDF already has a Gw interface towards the PCEF and a Gwn interface towards the TDF interface, similar interfaces are required towards the PCRF, the TSSF and the BBSC, e.g. for legacy deployments.

The following names for the new interfaces will be used through this disclosure: Gwp between the PFDF to the PCRF, Gwt between the PFDF and the TSSF and Gwb between the PFDF and the BBSC.

Centralizing classification rule definition, verification, synchronization, translation, conversion, and distribution reduces configuration in SDN and PCC domains and will eliminate misalignments. Also, it will allow for the exposure of network capabilities to third party OTT Content Providers that will now have the possibility of collaboration with networks not only for charging use cases but also for service chaining uses cases as well.

The centralization will reduce functionality duplication, leading to reduced implementation costs.

Specifically, the usage of for instance the new Gwt interface between the PFDF and the SDNc-P, or TSSF, may have the following benefits according to at least some embodiments:

Usage of network-wide classification rules without the need of implementations at subscriber level, reducing complexity on the interfaces and avoiding duplication of network-level classification rules for each subscriber. Rather than including interfaces with one rule per subscriber being all rules equal a single network-wide rule can be exchanged and applicable to all subscribers.

Conversion of network-wide OTT provided classification rules can be centralized in the PFDF and if required, different conversions can be implemented for PCC or SDN use cases.

Classification rule repository functionality is implemented in the PFDF for use cases that require synchronization (node reboots or crashes) and that can be shared for both PCC and SDN use cases.

No need to use traffic classification for the purposes of converting network-wide classification rules to subscriber traffic filters and intended for the SDN solution. Traffic classification will be required if Openflow is not desired and NSH is preferred but these uses cases can use prior art techniques and are left outside of the scope of this disclosure.

Reduced complexity and reduced set of nodes involved in the implementation (only 2).

Gwt and Gwb Interfaces

The Gwt and the Gwb interfaces are similar. However, the Gwt interface goes to the SDNc-P and the Gwb interface goes to a legacy BBSC.

The role of both interfaces is to convey network-wide traffic filters from the PFDF. The PFDF, acting as the centralized repository of the classification rules receives OTT classifications rules from the OTT control on an OTT-specific format and performs conversion from these OTT classification rules to traffic filters suitable for the PCC and SDN solutions.

For instance, the following set of OTT classification rules are extracted from a real-life example:

```
"category": "iorg",
"dns_patterns": [
    {
        "patterns": [
            "fb.me",
            "*.fb.me",
            "i.org",
            ...
        ],
        "type": "FACEBOOK"
    },
],
"info": "The IP ... ",
"pool_configs": [
    {
        "description": "Pool of Facebook IPs",
        "ipv4": [
            "2.17.31.10/32",
            "2.18.227.10/32",
            "2.20.23.10/32",
            ...
```

OTT provides classification configuration, e.g. OTT classification rules, that makes it possible to identify the traffic.

The PFDF will have the responsibility to convert those OTT classification rules into PCEF readable classification rules for PCC use cases and SDNc-P readable traffic filters for SDN use cases.

For PCC use cases and in some embodiments, the rule "dns_patterns" with a list of patterns will be converted on the Gw/Gwn interface to a set of rules, one per domain, in for example the following list: "domain fb.me", "domain*.fb.me" . . . etc. The details of the Gw/Gwn interface are still to be defined so the list described should be formatted according to the Gw/Gwn specification.

Decomposition of Packet Flow Descriptors into OpenFlow Match Filters

The Gwt and Gwb interfaces according to the embodiments herein connect the PFDF to the SDN.

In SDN, the term "traffic classification" is not used. Instead, the OpenFlow switches 109 (OFS in FIG. 4) receive "match filters" from the SDN controller for the purposes of filtering traffic and implement for instance Service Chaining towards a set of SFs 108.

The SDN controller, by installing different match filters in the OpenFlow Switches, can instruct those switches to forward only certain flows to some Service Functions. This functionality is called "Service Chaining" and a good example could be to forward video traffic to a video optimizer while leaving other, non-video traffic, out of the optimizer.

As mentioned above, the embodiments herein enable this use case with information retrieved from the OTTs via the PFDF. For that, the PFDF may convert the Packet Flow Descriptors received from the OTTs as classification configuration into match filters, as defined in the OpenFlow protocol, that can be used by the SDN controller to instruct the OpenFlow Switches on how to perform the switching.

Additionally, an enforcement action—i.e. to which function to send a specific flow—can be included from the OTT to the PFDF, in the form of classification configuration, and then to the SDNc-P, in the form of traffic filters, and to the OpenFlow Switches (OFS), in the form of match filters, to allow suggestions from OTTs on how their traffic should be processed. Maybe an OTT can include, along with a Packet Flow Descriptors for video traffic, an indication or suggestion that the traffic should be sent to a video optimizer.

The following table shows the match filters supported by Open Flow:

TABLE 1

OpenFlow match filters

| Field | | Description |
|---|---|---|
| OXM_OF_IN_PORT | Required | Ingress port. This may be physical or switch-defined logical port. |
| OXM_OF_ETH_DST | Required | Ethernet destination address. Can use arbitrary bitmask |
| OXM_OF_ETH_SRC | Required | Ethernet source address. Can use arbitrary bitmask |
| OXM_OF_ETH_TYPE | Required | Ethernet type of the OpenFlow packet payload, after VLAN tags. |
| OXM_OF_IP_PROTO | Required | IPv4 or IPv6 protocol number |
| OXM_OF_IPV4_SRC | Required | IPv4 source address. Can use subnet mask or arbitrary bitmask |
| OXM_OF_IPV4_DST | Required | IPv4 destination address. Can use subnet mask or arbitrary bitmask |
| OXM_OF_IPV6_SRC | Required | IPv6 source address. Can use subnet mask or arbitrary bitmask |
| OXM_OF_IPV6_DST | Required | IPv6 destination address. Can use subnet mask or arbitrary bitmask |
| OXM_OF_TCP_SRC | Required | TCP source port |
| OXM_OF_TCP_DST | Required | TCP destination port |
| OXM_OF_UDP_SRC | Required | UDP source port |
| OXM_OF_UDP_DST | Required | UDP destination port |

Also, Open Flow implements the following actions to be executed when a match filter is matched:
  Redirect the packet to one output port
  Divert the data path packet to the Open Flow controller
  Drop the packet On the other hand, OTTs can send a wide range of information that the PFDF needs to consolidate into Packet Flow Descriptors. Common examples of that information include any one of:
  subnets: IP address or subnets, both overlapping and not.
  domain: including domain name.
  SNI: including a Server Name Indication for TLS traffic.
  URL: including a Uniform Resource Locator for HTTP traffic.

Enforcement actions suggested by OTTs could include any one of:
  Optimize video: send video traffic to an application level video optimizer.
  Optimize Transmission Control Protocol (TCP): send TCP traffic to a transport level TCP optimizer.
  Network Address Translation (NAT) Full Cone: for Voice over IP applications choose a Full Cone Network Address Translation vs others that can interfere with the signaling (like Restricted Cone NAT or Asymmetric NAT that could be used for all other types of traffic, as default).
  No action: leave action to operator (for instance default action would be to send traffic to a Parental Control function to perform Content Filtering).

Therefore, it might be responsibility of the PFDF to adapt the information and actions received from the OTTs into Open Flow like match filters and actions that the SDNc-P could send to the OFS for the purposes of Service Chaining. This may include any one of:
  For subnets not overlapping: direct translation to Open Flow IP addresses (allow masks).
  For subnets with overlapping: remove overlapping by preserving high priority subnets without changes and splitting low priority subnets into smaller subnets that don't collide with the others. So if "A" is a high priority subnet and "Z=A+B+C" a lower priority subnet, "Z'=B+C" might be sent to the SDNc-P, that is, the overlapping should be removed.
  domain: the PFDF should have Domain Name System (DNS) resolution capabilities to convert domains into IPs to be fed to the SDNc-P.
  SNI: same as the above, the SNI provided for SSL/TLS traffic might be resolved like any other domain via DNS capabilities in the PFDF. Additionally, a protocol, e.g. TCP, and a port, typically 443, can be added to the resulting match filter as SSL/TLS is always over TCP and usually occurs in that port.
  URL: the domain part of the URL might be extracted, resolved using DNS resolution as above. The resulting subnet to be sent as a match filter can be complemented with a transport protocol, such as TCP, and a port, e.g. 80, if more specificity is required, as HTTP usually happens on TCP:80.

Converting the actions suggested or requested by the OTT to specific OpenFlow actions can be deployment specific as OpenFlow allows for the specification of the "output port" and which Service Function (SF) is located in which port of the OFS may be deployment specific.

For these purposes, and given that the details of in which port a SF is located will be known to the SDNc-P, a single mapping to integers can be used in the Gwt/Gwb interface. The following mapping in an example:

TABLE 2

Action mapping in Gwt/Gwb

| Action | Action Id in Gwt/Gwb |
|---|---|
| Optimize Video | 1 |
| Optimize TCP | 2 |
| NAT Full Cone | 3 |
| No Action | 4 |

Finally, the scope of the Packet Flow Descriptors and of the match filters is network-wide, and not subscriber specific. The information pushed from the OTT to the OFS through the PFDF and the SDNc-P will apply to all traffic on the network, and will have to be duplicated per subscriber or conveyed per subscriber between the different functions.

The exchange mechanism for the traffic filters converted by the PFDF and destined for the SDNc-P might be a REST interface in which the transport is HTTP traffic, e.g. in clear-text or encrypted, and the payload for the transaction is JavaScript Object Notation (JSON) formatted. A single HTTP Request will allow for the update of all the traffic filters in the SNDc-P to represent the OTT classification rules in the PFDF.

Following the example above, a GET Request could be sent from the PFDF to the SDNc-P to the top level URL ("/") with the following JSON payload to request the implementation of the said traffic filters:

```
[
    "install-rule-id": 3232,
    "ip": "2.17.31.10/32",
    "protocol": "TCP",
    "port": "80",
    "action": "2",
    ...
]
```

In the example above, TCP traffic to 2.17.31.10/32 and port 80 will be switched to a TCP optimizer by the network.

The names of the fields are examples; others can be used. In this example, "ip", "protocol", "port" and "action" are used to represent the concepts explained above.

A field "install-rule-id" is included to convey from the PFDF to the SDNc-P that a new match filter is to be installed. Since OTTs could at any moment change the information they provide, the PFDF could have the following capabilities towards the SDNc-P:

Install rules: using "install-rule-id" as per above

Uninstall rules: removing a rule by id should be possible by issuing an "uninstall-rule-id" request Reset the set of installed rules: for synchronization purposes and after failures and reboots, the PFDF could be able to either a) recover the list of rules installed in the SDNc-P or b) reset all the rules and install a new up-to-date batch. An empty "uninstall-rule-id" could be used to remove all rules before a fresh installation.

The rule-id in the example above represents a Packet Flow Description in the PFDF or a section of it if some split has been necessary. It will be the responsibility of the SDNc-P to build the appropriate chain with that rule and to select the relevant Service Functions (SF).

The means by which the SDNc-P maps the actions on the Gwt/Gwb interface to ports in the OFS are left open, i.e. not further specified herein. An approach may be that of manual local configuration in the SDNc-P, with each action having an associated port.

Figure 8:
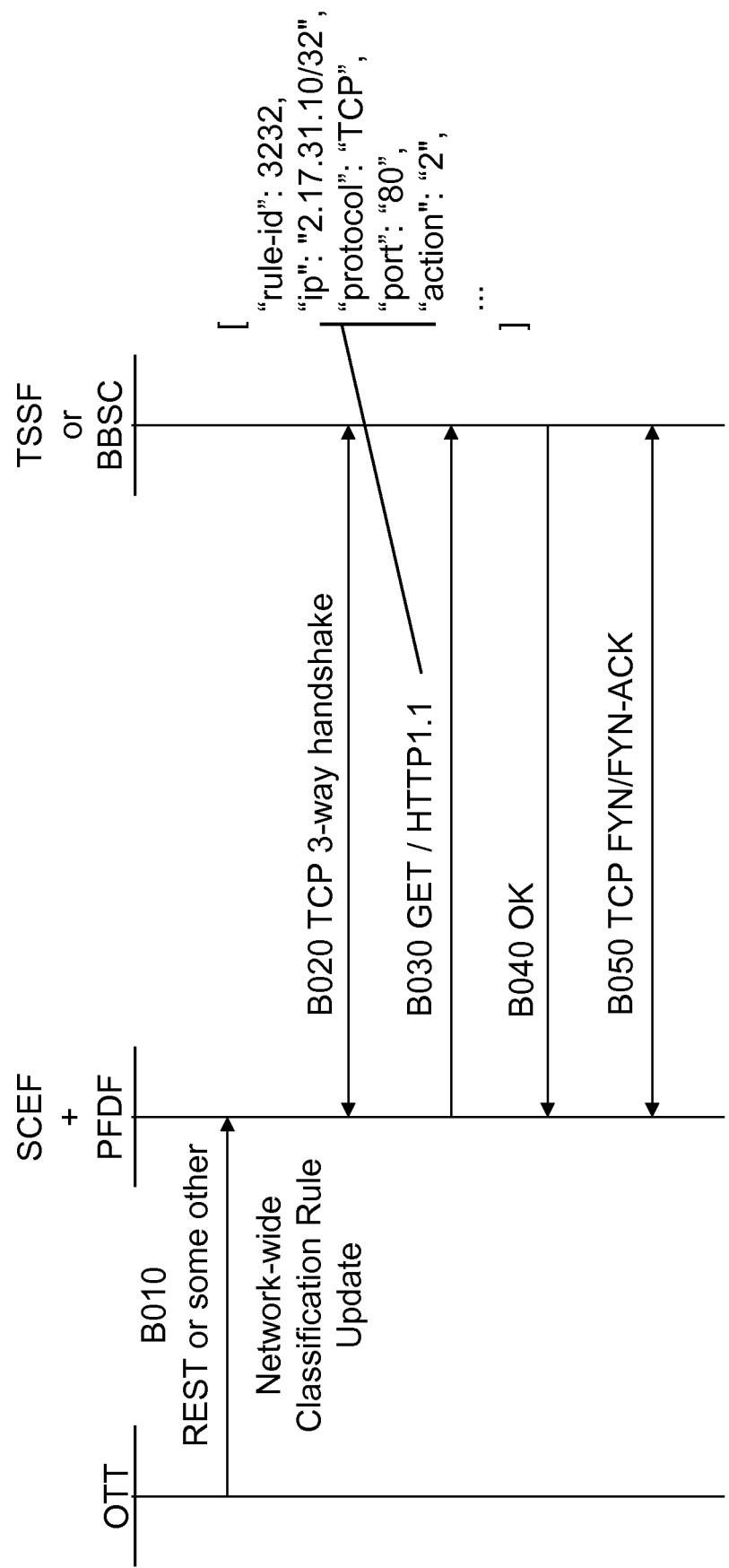
FIG. 8 is a combined signaling and flowchart of embodiments of the method in the classification configuration module.

FIG. 8 depicts an example for a simple GET Request towards the SDNc-P that will update the network-wide match filters for Dynamic Service Chaining. In this example, the classification configuration module 110 is exemplified by the PFDF, the SDN controlling module is exemplified by the TSSF or BBSC and the service related module is exemplified by the OTT.

One or more of the following actions may be performed.

Action B010

The OTT may send a message indicating that one or more network-wide classification rules shall be updated to the SCEF/PFDF, in this example hereafter referred to as PFDF. The message may also comprise the network-wide classification rules. This action may be similar to action A010 above.

Action B020

The PFDF and the TSSF/BBSC, in this example hereafter referred to as TSSF, performs a TCP 3-way handshake according to known manners in order to set up a secure HTTP-connection between the PFDF and the TSSF.

The PFDF may convert the network-wide classification rules included in the received message into traffic filters, e.g. match filters, that can be used by the TSSF to configure the OFS controlled by it.

This action may be similar to action A020 above.

Action B030

The PFDF sends an HTTP-GET command to the TSSF. The command may include as traffic filter:

```
[
    "rule-id": 3232,
    "ip": "2.17.31.10/32",
    "protocol": "TCP",
    "port": "80",
    "action": "2",
    ...
]
```

This action may be similar to action A030 above.

Action B040

If the command is successful received by the TSSF, the TSSF subsequently sends an OK as a confirmative response back to the PFDF.

Action B050

The PFDF and the TSSF exchanges TCP FYN/FYN-ACK to confirm and close the connection.

The interfaces thus described could be used to update traffic filters or to synchronize the current set of traffic filters with the PFDF— which holds the master repository for classification rules in the network. In this manner, errors may be detected and safety may be ensured.

Gwp Interface

At the Gwp interface, network-wide OTT classification rules may be converted to subscriber specific traffic filters in order to be exchanged with the PCRF.

Compared with the interfaces Gwt and Gwb above, for the Gwp interface the conversion is done at subscriber level, which increases complexity without allowing for additional functionality, i.e. the network-wide classification rules are merely duplicated at subscriber level and converted into traffic filters at subscriber level. Moreover, an additional node, i.e. the PCRF, conveys the information towards the SDNc-P, where the PCRF merely forwards the received traffic filters at subscriber level.

Figure 9:
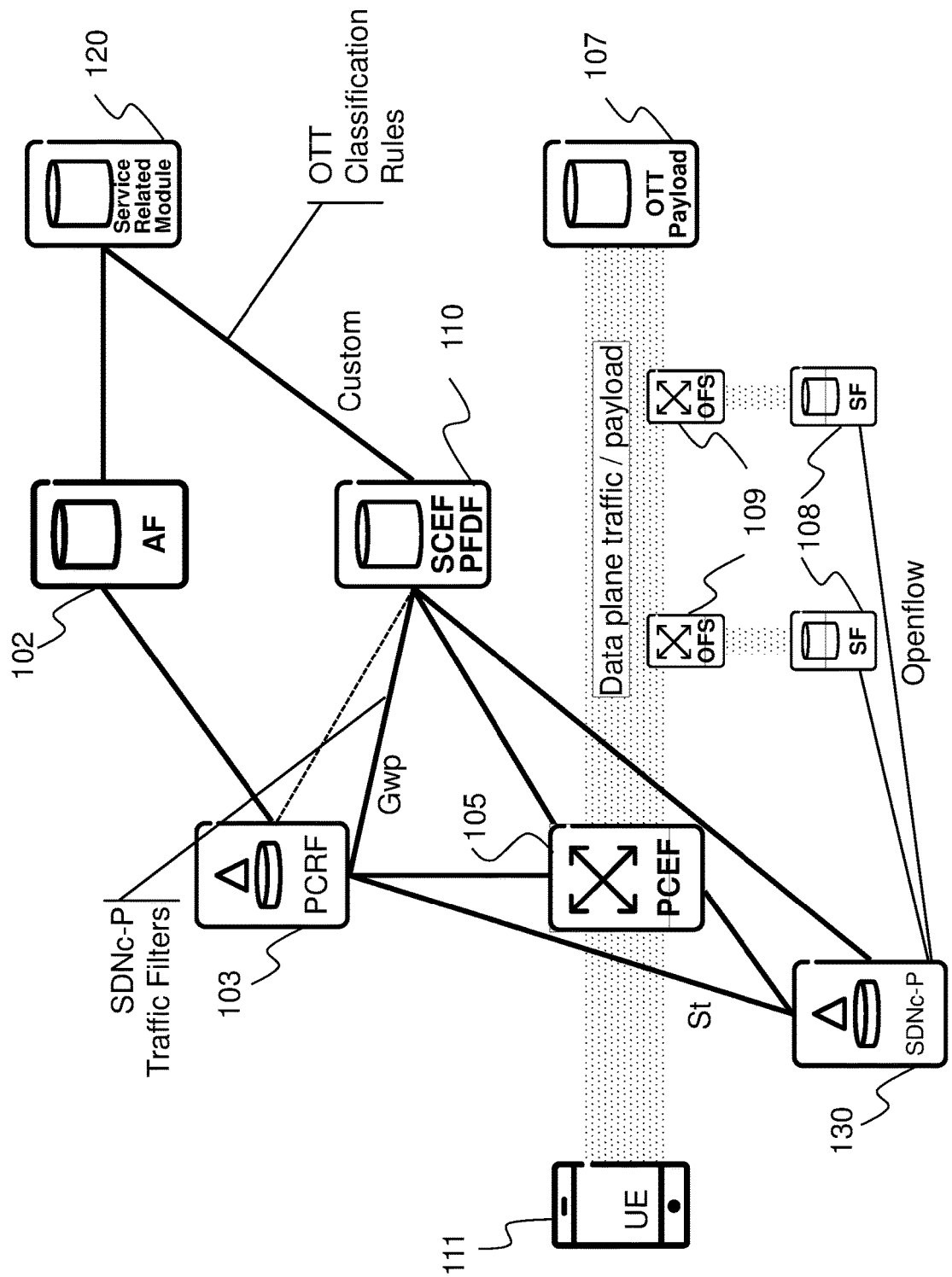
FIG. 9 is a further overview of a system according to embodiments herein.

In FIG. 9, a schematic overview of a portion of FIG. 5 is illustrated in order to more clearly present the Gwp-interface. Again, the same or similar entities and functions as in FIGS. 1, 3, 4 and 5 are illustrated using the same reference numerals as in FIGS. 1, 3, 4 and 5 when applicable. Description of these entities and functions are omitted for simplicity again.

Since subscriber dimension is used at Gwp-interface, a Diameter based interface is proposed, also aligning this interface in the PCRF with others like Gx, Sd and Rx.

The Gwp interface is different from the Nt interface. The Nt interface goes from the SCEF to the PCRF while the Gwp goes from the PFDF to the PCRF. The Nt interface will allow for OTT classification rules un-converted directly from the OTTs, so different OTTs will push rules in different formats to the PCRF through the Nt interface. The Gwp interface includes OTT classification rule conversion and will make sure that subscriber specific traffic filters in a single format, irrespective of the format used by each OTT, are pushed to the PCRF.

Diameter CCRs (initial and termination) and CCAs can be used to setup connections between the different elements in the solution. Typically, the PFDF will behave as a server in this scenario. RARs and RAAs can be used to notify the need to update the subscriber specific traffic filters and specific Attribute Value-Pairs (AVPs) can be used to convey those subscriber specific traffic filters.

Typically, to convey 5-tuple information a Flow-Description AVP, defined in 3GPP TS 29.214, can be used. This AVP can use wildcards to express "ANY" values and it can therefore be used to share for instance IP lists or pools to classify services.

Additional AVPs will have to be defined to convey the rule-id value (identifying in the PFDF the source classification rule for the subscriber specific traffic filter) and other traffic filters like domains, URLs and SNIs. The following table defines the rule-id AVP:

| | Vendor ID = 193 (Ericsson) | | | | | |
|---|---|---|---|---|---|---|
| | | | | AVP Flag Rules | | |
| AVP Name | AVP Code | Data Type | Must | May | Should not | Must not |
| PFDF-rule-id | 1061 | Unsigned32 | V | | | M, P |

For SNIs, the following AVP can be used:

| | Vendor ID = 193 (Ericsson) | | | | | |
|---|---|---|---|---|---|---|
| | | | | AVP Flag Rules | | |
| AVP Name | AVP Code | Data Type | Must | May | Should not | Must not |
| PFDF-SNI | 1062 | Char | V | | | M, P | and so on for other rules.

Figure 10:
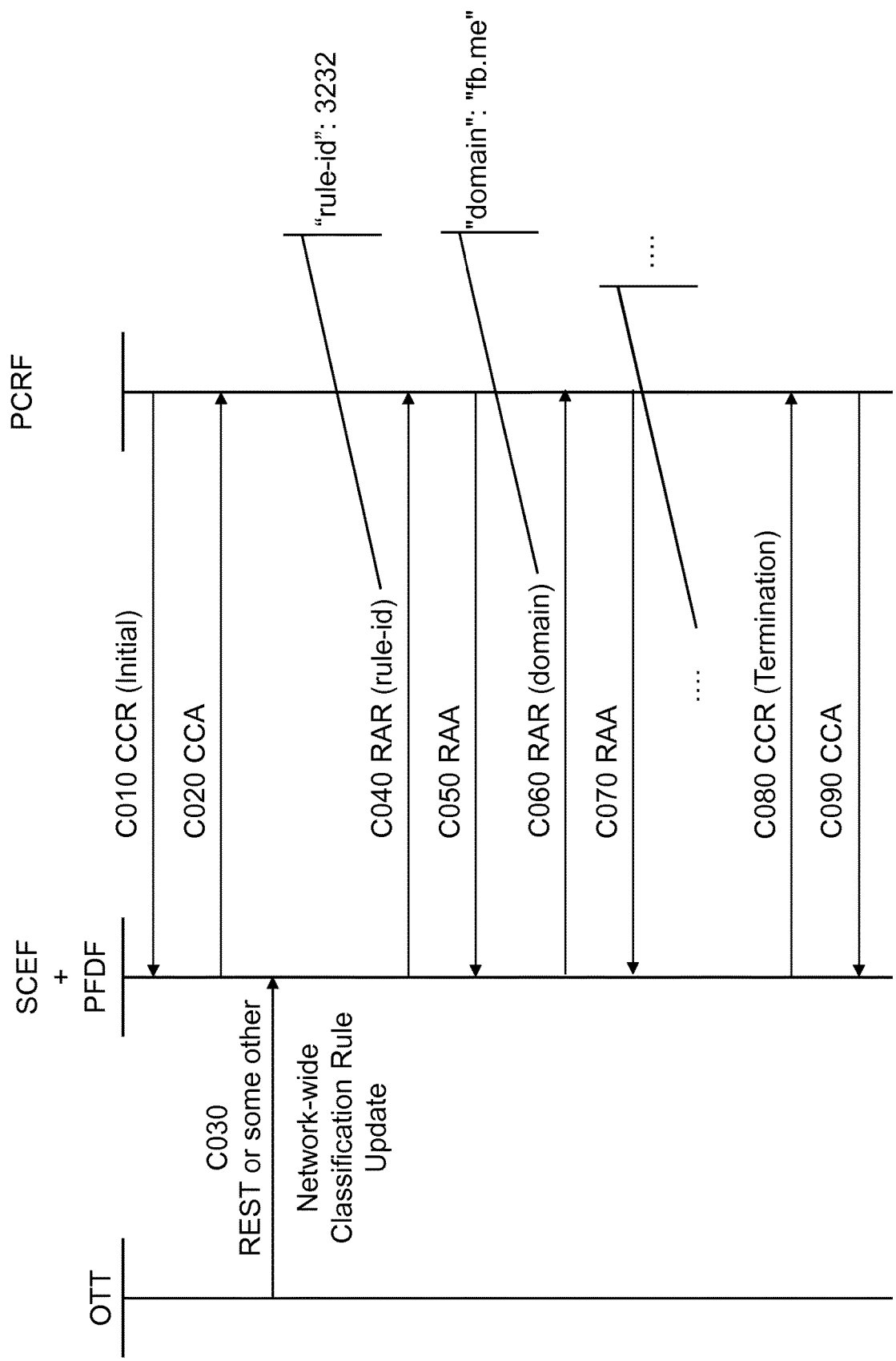
FIG. 10 is a combined signaling and flowchart of further embodiments of the method in the classification configuration module.

FIG. 10 depicts an example transaction over Gwp interface. The interface is setup before any subscriber specific traffic filter is pushed from the SCEF/PFDF, referred hereafter as PFDF in this example, to the PCRF.

Action C010

The PCRF sends a Credit Control Request (CCR) to the PFDF.

Action C020

Subsequently, the PFDF sends a Credit Control Answer (CCA). These initial CCR/CCA are used to setup the connection as in any Diameter based protocol. The Gwp interface will be implemented per subscriber, so while with the previous Gwt and Gwb interfaces a single HTTP request updates all the network-wide traffic filters, one diameter connection per subscriber specific traffic filter will be required for the Gwp interface.

Action C030

The OTT sends a message, indicating that one or more network-wide classification rules shall be updated, to the PFDF.

Action C040

Subsequently to having determined subscriber specific traffic filters for the one or more network-wide classification rules, the PFDF sends for each subscriber a Reauthorization Request (RAR) including at least the rule-id and additional AVPs containing the traffic filters, see action C060.

Action C050

The PCRF sends a Reauthorization Answer (RAA) confirming successful reception when applicable.

Action C060

The PFDF may send, for each subscriber, additional AVPs containing the subscriber specific traffic filters.

Action C070

The PCRF sends a Reauthorization Answer (RAA) confirming successful reception when applicable.

Hence, for each subscriber, traffic filters are updated via a RAR including at least the rule-id, which identifies a network-wide classification rule at the PFDF, and additional AVPs containing the traffic filters, information identifying the traffic filters. In this example a separate RAR is used to convey a domain AVP but it should also be possible to convey all the AVPs (rule-id, domain and others) in the same RAR. A RAA finishes the traffic filter update.

Action C080

The PFDF sends a CCR in order to terminate the connection.

Action C090

In response thereto, the PCRF sends a CCA confirmation the closing of the connection.

Hence, a CCR/CCA (termination) is used to close the connection. Connections can be kept open for future updates or closed after each individual update, which then would be reopened for further updates of the classification configuration.

Figure 11:
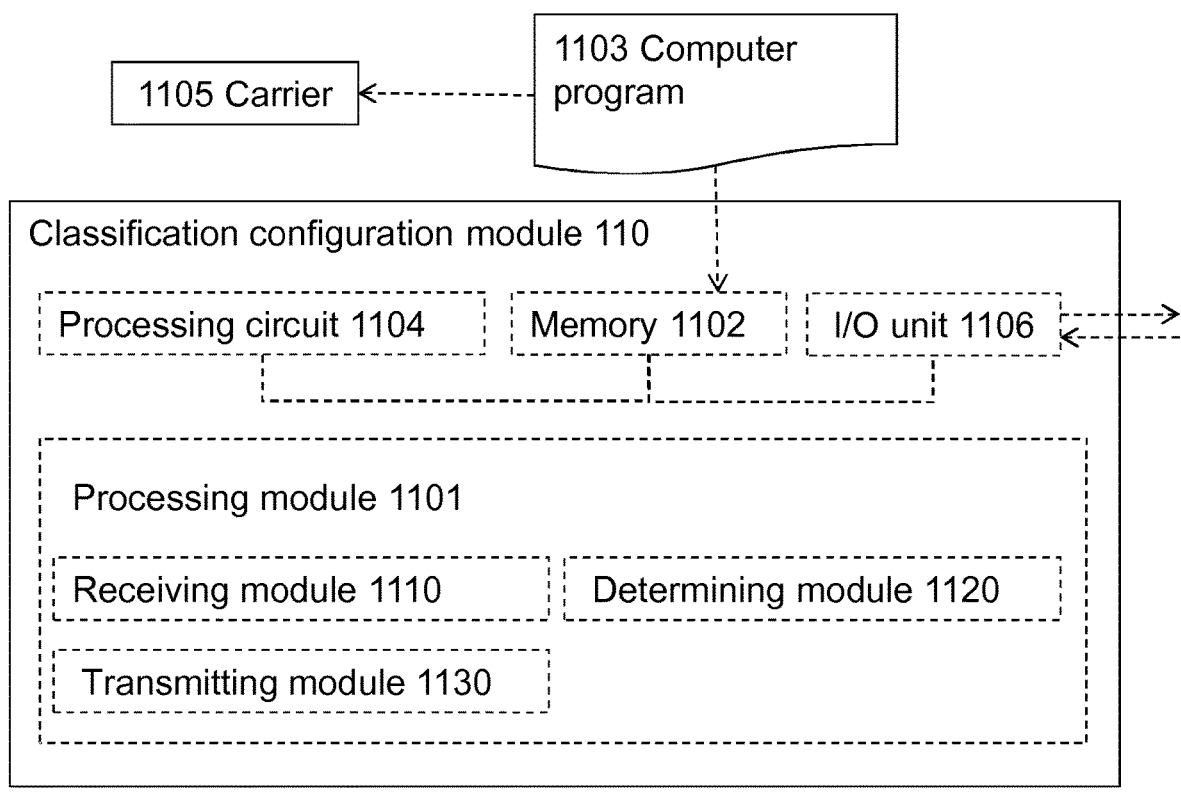
FIG. 11 is a block diagram illustrating embodiments of the classification configuration module.

With reference to FIG. 11, a schematic block diagram of embodiments of the classification configuration module 110 of FIG. 1 is shown.

The classification configuration module 110 may comprise a processing module 1101, such as a means for performing the methods described herein. The means may be embodied in the form of one or more hardware modules and/or one or more software modules The classification configuration module 110 may further comprise a memory 1102. The memory may comprise, such as contain or store, instructions, e.g. in the form of a computer program 1103, which may comprise computer readable code units.

According to some embodiments herein, the classification configuration module 110 and/or the processing module 1101 comprises a processing circuit 1104 as an exemplifying hardware module, which may comprise one or more processors. Accordingly, the processing module 1101 may be embodied in the form of, or 'realized by', the processing circuit 1104. The instructions may be executable by the processing circuit 1104, whereby the classification configuration module 110 is operative to perform the methods of FIG. 7 and/or FIG. 8 and/or FIG. 10. As another example, the instructions, when executed by the classification configuration module 110 and/or the processing circuit 1104, may cause the classification configuration module 110 to perform the method according to FIG. 7 and/or FIG. 8 and/or FIG. 10.

In view of the above, in one example, there is provided a classification configuration module 110 for managing a classification configuration for traffic, related to a service, in a software defined network 100. Again, the memory 1102 contains the instructions executable by said processing circuit 1104 whereby the classification configuration module 110 is operative for:

receiving the classification configuration from a service related module 120, wherein the classification configuration includes a first indication indicating a traffic treatment for the traffic, and a second indication identifying the traffic to be treated according to the first indication for traffic treatment, determining, based on the classification configuration, a set of traffic filters for use by a software defined network controlling module 130 to determine a list of service functions implementing the traffic treatment for the traffic, and transmitting information relating to the set of traffic filters to the software defined network controlling module 130.

FIG. 11 further illustrates a carrier 1105, or program carrier, which comprises the computer program 1103 as described directly above.

In some embodiments, the classification configuration module 110 and/or the processing module 1101 may comprise one or more of a receiving module 1110, a determining module 1120, and a transmitting module 1130 as exemplifying hardware modules. In other examples, one or more of the aforementioned exemplifying hardware modules may be implemented as one or more software modules.

Moreover, the processing module 1101 comprises an Input/Output unit 1106, which may be exemplified by the receiving module and/or the transmitting module when applicable.

Accordingly, the classification configuration module 110 is configured for managing a classification configuration for traffic, related to a service, in a software defined network 100.

Therefore, according to the various embodiments described above, the classification configuration module 110 and/or the processing module 1101 and/or the receiving module 1110 is configured for receiving the classification configuration from a service related module 120, wherein the classification configuration includes a first indication indicating a traffic treatment for the traffic, and a second indication identifying the traffic to be treated according to the first indication for traffic treatment.

Furthermore, the classification configuration module 110 and/or the processing module 1101 and/or the determining module 1120 is configured for determining, based on the classification configuration, a set of traffic filters for use by a software defined network controlling module 130 to determine a list of service functions implementing the traffic treatment for the traffic.

Moreover, the classification configuration module 110 and/or the processing module 1101 and/or the transmitting module 1130 is configured for transmitting information relating to the set of traffic filters to the software defined network controlling module 130.

The information relating to the set of traffic filters may comprise at least one of a set of identifiers of the set of traffic filters and the set of traffic filters.

The first indication may indicate any one of optimizing, forwarding, converting, redirecting, resource allocating, differentiating charging, and the second indication may identify anyone of a traffic type, a protocol, a destination, a domain, a Uniform Resource Locator, URL, a server name indication, SNI, and a service.

The classification configuration module 110 and/or the processing module 1101 and/or the determining module 1120 is further configured for determining the set of traffic filters, based on the classification configuration, by identifying a mapping for the second indication, and applying the mapping to the second indication to obtain the set of traffic filters.

The classification configuration module 110 and/or the processing module 1101 and/or the transmitting module 1130 is further configured for transmitting the information relating to the set of traffic filters by transmitting the first indication indicating the traffic treatment for the traffic, and the second indication identifying the traffic to be treated according to the first indication for traffic treatment.

The classification configuration module 110 may be a Packet Flow Description Function, PFDF, module.

The service related module 120 may be any one of an Over-The-Top, OTT, related module and a Service Capability Exposure Function, SCEF, module.

The software defined network controlling module 130 may be anyone of a Software Defined Network, SDN, controller, and a Traffic Steering Support Function, TSSF, module.

The set of traffic filters may comprise Open Flow match filters usable by the software defined network controlling module 130 to construct a service chaining on Open Flow switches to forward matching traffic towards a set of service functions.

As used herein, the term "user equipment" may refer to a wireless communication device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor device may detect any kind of metric, such as wind, temperature, air pressure, humidity, light, electricity, sound, images etc. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a classification configuration module, the classification configuration module being one of a packet flow description function (PFDF) module and a service capability exposure function (SCEF) module, for managing a classification configuration for traffic related to a service in a software defined network, the method comprising:
receiving the classification configuration from a service related module, the classification configuration indicating classification rules for the service-related traffic, and identifying the service-related traffic to be treated according to the classification rules;
mapping the classification rules to a set of traffic filters for use by a software defined network controlling module to determine a list of service functions implementing the classification rules for the service-related traffic; and
transmitting traffic filters of the set of traffic filters to the software defined network controlling module via an interface between the classification configuration module and the software defined network controlling module, the interface configured to bypass a policy and charging rules function, PCRF, and a policy and charging enforcement function, PCEF.

2. The method according to claim 1, wherein the indication of classification rules for the service-related traffic includes an indication of traffic filters of the set of traffic filters to be transmitted to the software defined network controlling module.

3. The method according to claim 1, wherein the first indication of classification rules for the service-related traffic includes an indication of at least one of optimizing, forwarding, converting, redirecting, resource allocating and differentiating charging, and further identifies at least one of a traffic type, a protocol, a destination, a domain, a Uniform Resource Locator, URL, a server name indication, SNI, and a service.

4. The method according to claim 1, wherein transmitting the traffic filters includes transmitting a first indication indicating a traffic treatment for the service-related traffic, and a second indication identifying the service-related traffic to be treated according to the first indication for traffic treatment.

5. The method according to claim 1, wherein the classification configuration module is a Packet Flow Description Function, PFDF, module.

6. The method according to claim 1, wherein the service related module is an Over-The-Top, OTT, control.

7. The method according to claim 1, wherein the software defined network controlling module is anyone of a Software Defined Network, SDN, controller, and a Traffic Steering Support Function, TSSF, module.

8. The method according to claim 1, wherein the set of traffic filters comprises Open Flow match filters usable by the software defined network controlling module to construct a service chaining on Open Flow switches to forward matching traffic towards a set of service functions.

9. A computer storage device storing a computer program, comprising computer readable code units which when executed on a classification configuration module for managing a classification configuration for traffic related to a service in a software defined network, the classification configuration module being one of a packet flow description function (PFDF) module and a service capability exposure function (SCEF) module, causes the classification configuration module to:
  receive the classification configuration from a service related module, the classification configuration for the service-related traffic, and identifying the service-related traffic to be treated according to the classification rules;
  mapping the classification rules to a set of traffic filters for use by a software defined network controlling module to determine a list of service functions implementing the classification rules for the service-related traffic; and
  transmit traffic filters of the set of traffic filters to the software defined network controlling module via an interface between the classification configuration module and the software defined network controlling module, the interface configured to bypass a policy and charging rules function, PCRF, and a policy and charging enforcement function, PCEF.

10. A classification configuration module configured for managing a classification configuration for traffic related to a service, the classification configuration module being one of a packet flow description function (PFDF) module and a service capability exposure function (SCEF) module, in a software defined network, the classification configuration module being configured to:
  receive the classification configuration from a service related module, the classification configuration for the service-related traffic, and identifying the service-related traffic to be treated according to the classification rules;
  mapping the classification rules to a set of traffic filters for use by a software defined network controlling module to determine a list of service functions implementing the classification rules for the service-related traffic; and
  transmit traffic filters of the set of traffic filters to the software defined network controlling module via an interface between the classification configuration module and the software defined network controlling module, the interface configured to bypass a policy and charging rules function, PCRF, and a policy and charging enforcement function, PCEF.

11. The classification configuration module according to claim 10, wherein the indication of classification rules for the service-related traffic includes an indication of the traffic filters of the set of traffic filters to be transmitted to the software defined network controlling module.

12. The classification configuration module according to claim 10, wherein the indication of classification rules for the service-related traffic includes an indication of at least one of optimizing, forwarding, converting, redirecting, resource allocating, and differentiating charging, and further identifies at least one of a traffic type, a protocol, a destination, a domain, a Uniform Resource Locator, URL, a server name indication, SNI, and a service.

13. The classification configuration module according to claim 10, further configured to transmit the traffic filters by transmitting a first indication indicating a traffic treatment for the service-related traffic, and a second indication identifying the service-related traffic to be treated according to the first indication for traffic treatment.

14. The classification configuration module according to claim 10, wherein the classification configuration module is a Packet Flow Description Function, PFDF, module.

15. The classification configuration module according to claim 10, wherein the service related module is an Over-The-Top, OTT, control.

16. The classification configuration module according to claim 10, wherein the software defined network controlling module is anyone of a Software Defined Network, SDN, controller, and a Traffic Steering Support Function, TSSF, module.

17. The classification configuration module according to claim 10, wherein the set of traffic filters comprises Open Flow match filters usable by the software defined network controlling module to construct a service chaining on Open Flow switches to forward matching traffic towards a set of service functions.

* * * * *